US012631791B2

(12) United States Patent
Awasthi et al.

(10) Patent No.: US 12,631,791 B2
(45) Date of Patent: May 19, 2026

(54) MULTIFUNCTIONAL CROSSLINKING AGENTS AND OPHTHALMIC DEVICES FORMED THEREFROM

(71) Applicant: Bausch + Lomb Ireland Limited, Dublin (IE)

(72) Inventors: Alok Kumar Awasthi, Pittsford, NY (US); Feng-Yang Shih, Rochester, NY (US); Mohammad Vatankhah Varnosfaderani, Rochester, NY (US); James Anthony DiBella, Jr., Macedon, NY (US); Mark R. Mis, Rush, NY (US); Jade J. Russell, Perry, NY (US)

(73) Assignee: BAUSCH + LOMB IRELAND LIMITED, Dublin (IE)

( * ) Notice: Subject to any disclaimer, the term of this patent is extended or adjusted under 35 U.S.C. 154(b) by 669 days.

(21) Appl. No.: 18/101,318

(22) Filed: Jan. 25, 2023

(65) Prior Publication Data

US 2023/0244000 A1 Aug. 3, 2023

Related U.S. Application Data

(60) Provisional application No. 63/305,728, filed on Feb. 2, 2022.

(51) Int. Cl.
*G02B 1/04* (2006.01)
*G02C 7/04* (2006.01)

(52) U.S. Cl.
CPC ............... *G02B 1/043* (2013.01); *G02C 7/04* (2013.01)

(58) Field of Classification Search
CPC ...................................................... G02B 1/043
See application file for complete search history.

(56) References Cited

U.S. PATENT DOCUMENTS 3,408,429 A 10/1968 Wichterle
3,660,545 A 5/1972 Wichterle
4,113,224 A 9/1978 Clark et al.
4,197,266 A 4/1980 Clark et al.
4,277,595 A * 7/1981 Deichert ................ C08G 77/20 526/279
4,555,732 A 11/1985 Tuhro
4,910,277 A 3/1990 Bambury et al.
5,070,215 A 12/1991 Bambury et al.
5,271,875 A 12/1993 Appleton et al.
5,449,729 A * 9/1995 Lai ........................ C07C 327/30 526/320
5,486,579 A 1/1996 Lai et al.
7,915,323 B2 3/2011 Awasthi et al.
7,994,356 B2 8/2011 Awasthi et al.
8,420,711 B2 4/2013 Awasthi et al.
8,703,891 B2 4/2014 Broad
8,827,447 B2 9/2014 Awasthi et al.
8,937,110 B2 1/2015 Alli et al.
8,937,111 B2 1/2015 Alli et al.
9,039,174 B2 5/2015 Awasthi et al.
9,156,934 B2 10/2015 Alli et al.
9,244,197 B2 1/2016 Alli et al.
10,160,854 B1 * 12/2018 Alhakimi ................ C08L 39/06
2005/0054802 A1 * 3/2005 Lai ......................... C08G 77/20 528/33
2010/0041822 A1 * 2/2010 Hashemzadeh ..... C08F 290/068 526/278
2010/0048818 A1 * 2/2010 Kennedy ................. C08L 33/26 525/100

FOREIGN PATENT DOCUMENTS

WO 2008/019044 A2 2/2008
WO PCT/EP2023/052343 A1 5/2023

OTHER PUBLICATIONS

Hayley A. Brown et al., "Zwitterionic Polymerization to Generate High Molecular Weight Cyclic Poly(Carbosiloxane)s", J. Am. Chem. Soc., 2013, pp. 18738-18741, 135.
Xuechun Zhang et al, "Preparation of cross-linked poly(methyl methacrylate) microspheres using an asymmetric cross-linker via dispersion polymerization and its application in light diffusers", Colloid and Polymer Science, 2020, pp. 495-504, 298.
I. Iturralde M. Paulis et al., "The effect of the crosslinking agent on the performance of propranolol imprinted polymers", European Polymer Journal, 2014, pp. 282-291, 53.
Bas G.G. Lohmiejer et al., "Organocatalytic Living Ring-Opening Polymerization of Cyclic Carbosiloxanes", Organic Letters, Organic Letters, 2006, pp. 4683-4686, vol. 8 No. 21.

(Continued)

*Primary Examiner* — Michael F Pepitone
(74) *Attorney, Agent, or Firm* — Michael E. Carmen; John E. Thomas

(57) ABSTRACT

A multifunctional crosslinking agent includes one or more repeating units of a siloxanyl group or a silyl-alkyl-siloxanyl group, and at least two ethylenically unsaturated reactive end groups. One of the at least two ethylenically unsaturated reactive end groups is a (meth)acrylate-containing reactive end group or an acrylamide-containing reactive end group and the other one is an allyl-containing reactive end group or a vinyl-containing reactive end group. Ophthalmic devices are formed from a polymerization product of a monomeric mixture containing one or more of the multifunctional crosslinking agents, one or more first ophthalmic device-forming comonomers having at least one reactive group that preferentially reacts with the (meth)acrylate-containing reactive end group or the acrylamide-containing reactive end group of the multifunctional crosslinking agent, and one or more second ophthalmic device-forming comonomers having at least one reactive group that preferentially reacts with the allyl-containing reactive end group or the vinyl-containing reactive end group of the multifunctional crosslinking agent.

20 Claims, No Drawings

(56) References Cited

OTHER PUBLICATIONS

Baohua Zhang et al. "Morphological Stabilization of Block Copolymer Worms Using Asymmetric Cross-Linkers during Polymerization-Induced Self-Assembly", Macromolecules, 2018, pp. 2776-2784, 51.

Binhong Lin, et al., "Ultrafast and Controlled Ring-Opening Polymerization with Sterically Hindered Strong Bases", Macromolecules, 2020,pp. 9000-9007, 53.

* cited by examiner

MULTIFUNCTIONAL CROSSLINKING AGENTS AND OPHTHALMIC DEVICES FORMED THEREFROM

PRIORITY CLAIM

The present application claims priority to U.S. Provisional Patent Application Ser. No. 63/305,728, entitled "Multifunctional Crosslinking Agents and Ophthalmic Devices Formed Therefrom," filed Feb. 2, 2022, and incorporated by reference herein in its entirety.

BACKGROUND

Ophthalmic devices such as contact lenses are made of various polymeric materials, including rigid gas permeable materials, soft elastomeric materials, and soft hydrogel materials. The majority of contact lenses sold today are made of soft hydrogel materials. Hydrogels are a crosslinked polymeric system that absorb and retain water, typically 10 to 80 percent by weight. Hydrogel lenses are commonly prepared by polymerizing a lens-forming monomeric mixture. In the case of silicone hydrogel lenses, a silicone-containing monomer is copolymerized with a hydrophilic monomer.

In the field of ophthalmic devices, various physical and chemical properties such as, for example, oxygen permeability, wettability, material strength and stability are a few of the factors that must be carefully balanced in order to provide a useable contact lens. For example, since the cornea receives its oxygen supply from contact with the atmosphere, oxygen permeability is an important characteristic for certain contact lens material. Wettability also is important in that, if the lens is not sufficiently wettable, it does not remain lubricated and therefore cannot be worn comfortably in the eye. Accordingly, the optimum contact lens would have at least both excellent oxygen permeability and excellent tear fluid wettability.

SUMMARY

In accordance with an illustrative embodiment, a multifunctional crosslinking agent comprises one or more repeating units of a siloxanyl group or a silyl-alkyl-siloxanyl group, and at least two ethylenically unsaturated reactive end groups, wherein one of the at least two ethylenically unsaturated reactive end groups is a (meth)acrylate-containing reactive end group or an acrylamide-containing reactive end group and the other one of the at least two ethylenically unsaturated reactive end groups is an allyl-containing reactive end group or a vinyl-containing reactive end group.

In accordance with another illustrative embodiment, an ophthalmic device which is a polymerization product of a monomeric mixture comprises:

(a) one or more multifunctional crosslinking agents comprising one or more repeating units of a siloxanyl group or a silyl-alkyl-siloxanyl group, and at least two ethylenically unsaturated reactive end groups, wherein one of the at least two ethylenically unsaturated reactive end groups is a (meth)acrylate-containing reactive end group or an acrylamide-containing reactive end group and the other one of the at least two ethylenically unsaturated reactive end groups is an allyl-containing reactive end group or a vinyl-containing reactive end group;

(b) one or more first ophthalmic device-forming comonomers having at least one reactive group that preferentially reacts with the (meth)acrylate-containing reactive end group or the acrylamide-containing reactive end group of the multifunctional crosslinking agent; and (c) one or more second ophthalmic device-forming comonomers having at least one reactive group that preferentially reacts with the allyl-containing reactive end group or the vinyl-containing reactive end group of the multifunctional crosslinking agent.

In accordance with yet another illustrative embodiment, a method for making an ophthalmic device comprises:

(a) curing a monomeric mixture in a mold, the monomeric mixture comprising:

(i) a multifunctional crosslinking agent comprising one or more repeating units of a siloxanyl group or a silyl-alkyl-siloxanyl group, and containing at least two ethylenically unsaturated reactive end groups, wherein one of the at least two ethylenically unsaturated reactive end groups is a (meth)acrylate-containing reactive end group or an acrylamide-containing reactive end group and the other one of the at least two ethylenically unsaturated reactive end groups is an allyl-containing reactive end group or a vinyl-containing reactive end group;

(ii) one or more first ophthalmic device-forming comonomers having at least one reactive group that preferentially reacts with the (meth)acrylate-containing reactive end group or the acrylamide-containing reactive end group of the multifunctional crosslinking agent; and (iii) one or more second ophthalmic device-forming comonomers having at least one reactive group that preferentially reacts with the allyl-containing reactive end group or the vinyl-containing reactive end group of the multifunctional crosslinking agent; and (b) dry releasing the ophthalmic device from the mold.

DETAILED DESCRIPTION

Various illustrative embodiments described herein are directed to multifunctional crosslinking agents and their use in forming ophthalmic devices such as contact lenses.

Ophthalmic devices such as contact lenses are prepared by polymerizing a lens-forming monomeric mixture. Conventional polymer formulations include two or more free-radical monomers with two different reactivities and a single crosslinking agent that can provide a polymer in which the two monomers coexist as essentially two homopolymers. During the initial stages of the polymerization reaction, one comonomer preferentially reacts with the crosslinking agent, and only after that comonomer is nearly consumed does the second comonomer begin to react with the crosslinking agent. In some instances, the large difference in the reactivities of the crosslinking agent and the second comonomer can provide a polymer with relatively large amounts of an unreacted second comonomer or oligomer, which must then be extracted from the polymer.

For example, N-vinyl lactams such as N-vinyl-2-pyrrolidone (NVP) can be copolymerized with an acrylate or methacrylate comonomer. However, N-vinyl lactams are known to be notoriously sluggish in free radical polymerization reactions with many of the more common acrylate-, methacrylate- and acrylamide-based monomers. Such copolymers are difficult to synthesize in a homogeneous controlled manner because of the difference in the polymerization reaction rates between the N-vinyl groups of NVP and the acryloyl or methacryloyl groups of the acrylate or methacrylate comonomer. One such problem is that the difference in the polymerization rates between allyl or vinyl groups of one comonomer and methacrylate or acrylamide groups of another comonomer can result in the allyl or vinyl monomers not being fully consumed while the methacrylate monomers are fully reacted. Therefore, the unreacted monomers may cause difficulty in a lens purification step and reduce the control of the lens formulation on the lens properties.

In addition, in this type of reaction one typically observes a phase separation and a corresponding decrease in the transparency of the polymeric lens material, or the mechanical properties of the lens material deteriorates as the lens absorbs water. This is very inefficient in terms of production cost (yields) and can be detrimental to the material properties. Also, it is often difficult to prepare a polymer from one production batch to another and stay within design specifications under such variable reaction conditions. Thus, there is a need for an improved ophthalmic device that overcomes the problems associated copolymerizing at least two monomers having different reactivities.

The ophthalmic devices described herein advantageously overcome the foregoing problems by reacting the comonomers having different reactivities with a multifunctional crosslinking agent resulting in an ophthalmic device having a relatively lower level of extractable material than those ophthalmic devices formed in the absence of a multifunctional crosslinking agent. Thus, the use of the multifunctional crosslinking agent in the ophthalmic device-forming monomeric mixture avoids an extraction step after forming the ophthalmic device.

In non-limiting illustrative embodiments, a multifunctional crosslinking agent includes one or more repeating units of one or more siloxanyl groups or one or more silyl-alkyl-siloxanyl groups, and containing at least two ethylenically unsaturated reactive end groups, wherein one of the at least two ethylenically unsaturated reactive end groups is a (meth)acrylate-containing reactive end group or a (meth)acrylamide-containing reactive end group and the other one of the at least two ethylenically unsaturated reactive end groups is an allyl-containing reactive end group or a vinyl-containing reactive end group.

As used herein, the term "(meth)" denotes an optional methyl substituent. Thus, terms such as "(meth)acrylate" denotes either methacrylate or acrylate, and "(meth)acrylamide" denotes either methacrylamide or acrylamide.

In a non-limiting illustrative embodiment, a multifunctional crosslinking agent comprises one or more repeating units of a siloxanyl group. In one illustrative embodiment, the multifunctional crosslinking agent comprises from about 3 to about 300 repeating units of the siloxanyl group. In another illustrative embodiment, the multifunctional crosslinking agent comprises from about 3 to about 90 repeating units of the siloxanyl group. In one illustrative embodiment, the siloxanyl group is represented by the following structure:

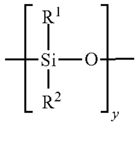

wherein $R^1$ and $R^2$ are independently hydrogen, a $C_1$ to $C_{12}$ alkyl group, a $C_1$ to $C_{12}$ halo alkyl group, a $C_3$ to $C_{12}$ cycloalkyl group, a $C_3$ to $C_{12}$ heterocycloalkyl group, a $C_2$ to $C_{12}$ alkenyl group, a haloalkenyl group, or a $C_6$ to $C_{12}$ aromatic group and y is from 3 to about 300 or from 3 to about 90.

In an illustrative embodiment, a multifunctional crosslinking agent comprising one or more repeating units of a siloxanyl group can be obtained in a stepwise anionic polymerization reaction. For example, in one illustrative embodiment, the repeating units of the siloxanyl group can be derived in a first step by a ring opening polymerization reaction of 1,1,4,4-tetramethyl-1,4-disila-5-oxacyclopentane (EDS) with a first monomer having a first reactive functionality group for reacting with the EDS, e.g., a hydroxyl group, and a second reactive functionality group which is one of the at least two ethylenically unsaturated reactive end groups optionally in the presence of an organocatalyst.

In illustrative embodiments, the first step of the reaction is carried out at a temperature ranging from about 0 to about 100° C. for a time period ranging from about 1 minute to about 24 hours. In an illustrative embodiment, the first monomer is added to the reaction mixture in an amount ranging from about 2 to about 20 wt. %, based on the total weight of the mixture. In an illustrative embodiment, the EDS compound is added to the reaction mixture in an amount ranging from about 5 to about 95 wt. %, based on the total weight of the mixture.

Suitable first monomers for reacting with the EDS compound include, for example, allyl $C_1$-$C_6$ alkanols such as allyl alcohol and the like; allyloxy $C_1$-$C_6$ alkanols such as allyloxymethanol, allyloxyethanol, allyloxypropanol and the like; (hydroxydimethylsilyl) $C_1$-$C_6$ alkyl methacrylates such as (hydroxydimethylsilyl)methyl methacrylate, (hydroxydimethylsilyl)ethyl methacrylate (hydroxydimethylsilyl)propyl methacrylate and the like; and alkali metal allyldimethylsilanolates such as potassium llyldimethylsilanolates and the like.

Suitable organocatalysts include, for example, 1,5,7-triazabicyclo[4.4.0]dec-5-ene (TBD), 1,3bis(2,4,6-trimethylphenyl)imidazol-2-ylidene, 1,3-diisopropyl-4,5-dimethylimidazol-2-ylidene, and 1,3,4,5-tetramethylimidazol-2-ylidene In an illustrative embodiment, the organocatalyst is added to the reaction mixture in an amount ranging from about 0.01 to about 20 wt. %, based on the total weight of the mixture.

Next, the ring opening polymerization reaction product obtained in the first step is reacted with a second monomer having a first reactive functionality group for reacting with the ring opening polymerization reaction product and a second reactive functionality group which is the other of the at least two ethylenically unsaturated reactive end groups to form the multifunctional crosslinking agent. Suitable second monomers include, for example, (dimethylchlorosilyl)alkyl methacrylates such as 3-(dimethylchlorosilyl)methyl methacrylate, 3-(dimethylchlorosilyl)ethyl methacrylate, 3-(dimethylchlorosilyl)propyl methacrylate and the like; allyldimethylchlorosilanes; and the like.

In illustrative embodiments, the second step of the reaction is carried out at a temperature ranging from about 0 to about 100° C. for a time period ranging from about 1 minute to about 24 hours. In an illustrative embodiment, the second monomer is added to the reaction mixture in an amount ranging from about 2 to about 20 wt. %, based on the total weight of the mixture. In an illustrative embodiment, the ring opening polymerization reaction product is added to the reaction mixture in an amount ranging from about 5 to about 95 wt. %, based on the total weight of the mixture.

Various synthetic schemes for obtaining a multifunctional crosslinking agent comprising one or more repeating units of a siloxanyl group are set forth below.

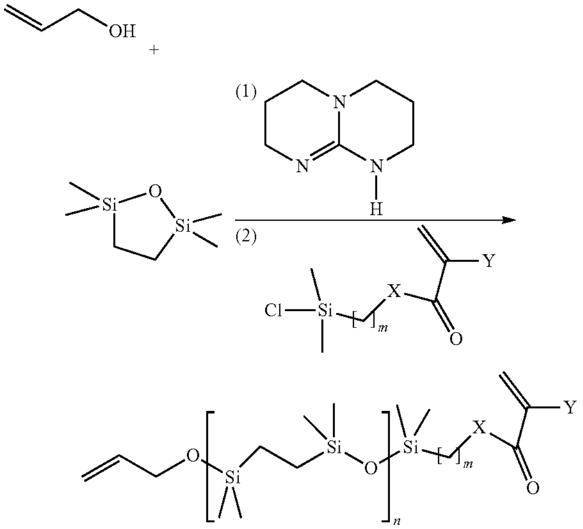

(A)
n = 1 to 100
m = 1 to 10
X = NH or O
Y = H or $CH_3$

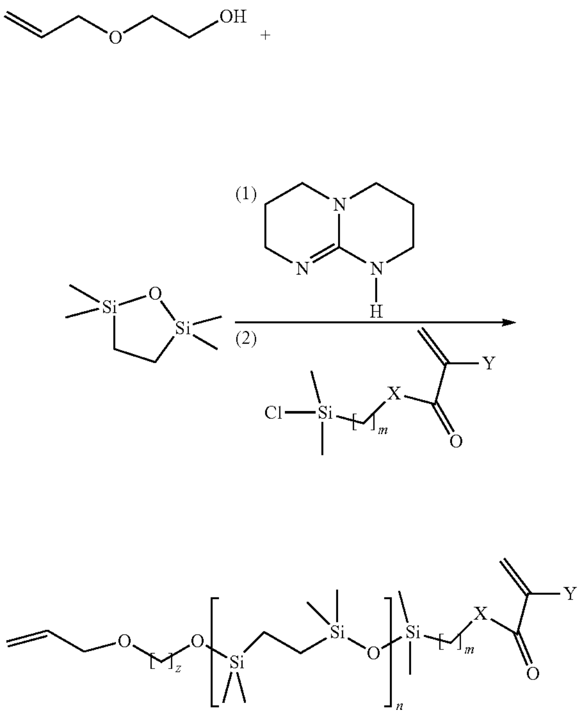

(B)
n = 1 to 100
m = 1 to 10
X = NH or O
Y = H or $CH_3$
Z = 1 to 10

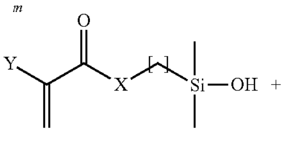

-continued

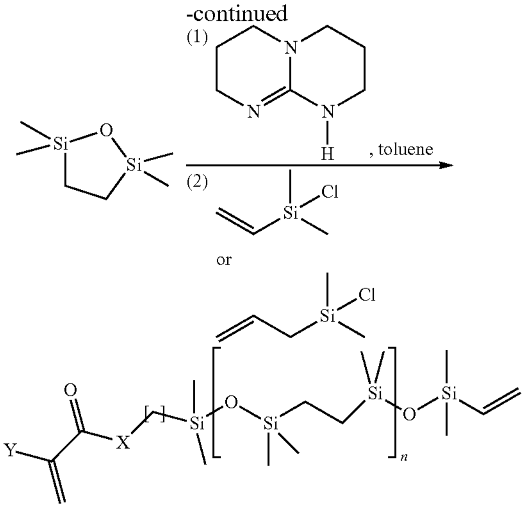

(C)

or

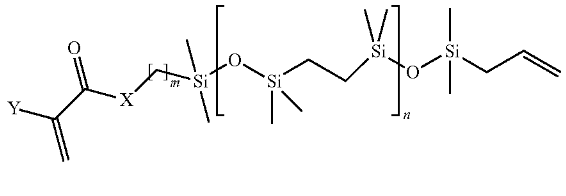

(D)
n = 1-100
m = 1-10
X = —NH— or —O—
Y = —H or —$CH_3$

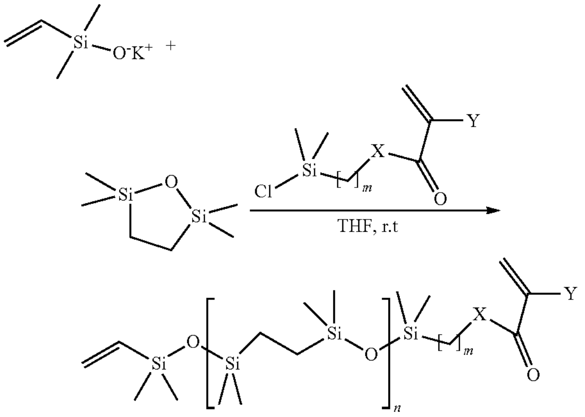

(E)
n = 1 to 100
m = 1 to 10
X = NH or O
Y = H or $CH_3$

In a non-limiting illustrative embodiment, a multifunctional crosslinking agent comprises one or more repeating units of a silyl-alkyl-siloxanyl group. In one illustrative embodiment, the multifunctional crosslinking agent comprises from about 1 to about 100 repeating units of a silyl-alkyl-siloxanyl group. In another illustrative embodiment, the multifunctional crosslinking agent comprises from about 1 to about 30 repeating units of a silyl-alkyl-siloxanyl group. The alkyl group of the silyl-alkyl-siloxanyl group can be an alkyl group having from 2 to about 4 carbon atoms or about 2 carbon atoms. In one illustrative embodiment, the silyl-alkyl-siloxanyl group is represented by the following structure:

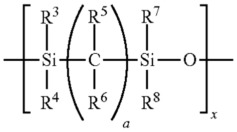

wherein $R^3$, $R^4$, $R^5$, $R^6$, $R^7$, and $R^8$ are independently hydrogen, a $C_1$ to $C_{12}$ alkyl group, a halo alkyl group, a $C_3$ to $C_{12}$ cycloalkyl group, a $C_3$ to $C_{12}$ heterocycloalkyl group, a $C_2$ to $C_{12}$ alkenyl group, haloalkenyl, or a $C_6$ to $C_{12}$ aromatic group; a is from 2 to 4 and x is from 1 to about 100 or from 1 to about 30.

In an illustrative embodiment, a multifunctional crosslinking agent comprising one or more repeating units of a silyl-alkyl-siloxanyl group can be obtained in a stepwise anionic polymerization reaction as described above. For example, in one illustrative embodiment, the silyl-alkyl-siloxanyl group can be derived in a first step by a ring opening polymerization reaction of hexamethylcyclotrisiloxane with a first monomer having a first reactive functionality group for reacting with the hexamethylcyclotrisiloxane, e.g., a hydroxyl group, and a second reactive functionality group which is one of the at least two ethylenically unsaturated reactive end groups optionally in the presence of an organocatalyst.

The first monomer and organocatalyst and the amounts thereof employed in the reaction can be the same as discussed hereinabove. In addition, the reaction conditions of the first step can be the same as those discussed hereinabove.

In illustrative embodiments, the amount of the hexamethylcyclotrisiloxane used in the reaction mixture can range from about 10 to about 95 wt. %, based on the total weight of the mixture.

Next, the ring opening polymerization reaction product obtained in the first step is reacted with a second monomer having a first reactive functionality group for reacting with the ring opening polymerization reaction product and a second reactive functionality group which is the other of the at least two ethylenically unsaturated reactive end groups to form the multifunctional crosslinking agent.

Suitable second monomers and the amounts employed as well as amounts thereof of the ring opening polymerization reaction product in the reaction can be the same as those discussed hereinabove. In addition, the reaction conditions of the second step can be the same as discussed hereinabove.

Various synthetic schemes for obtaining a multifunctional crosslinking agent comprising one or more repeating units of a silyl-alkyl-siloxanyl group are set forth below.

-continued

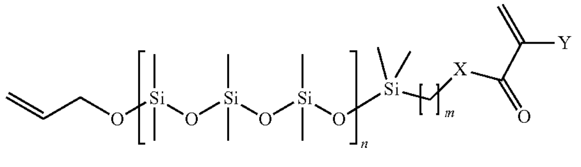

(A)
n = 1 to 100
m = 1 to 10
X = O or NH
Y = H or $CH_3$

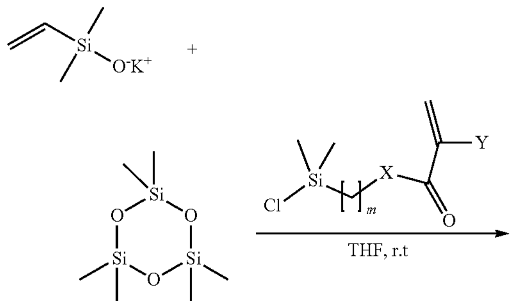

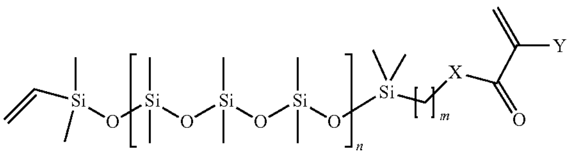

(B)
n = 1 to 100
m = 1 to 10
X = O or NH
Y = H or $CH_3$

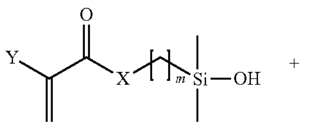

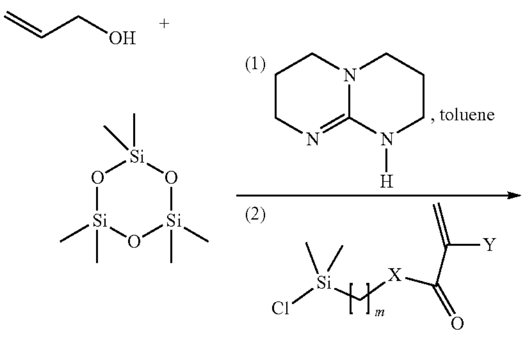

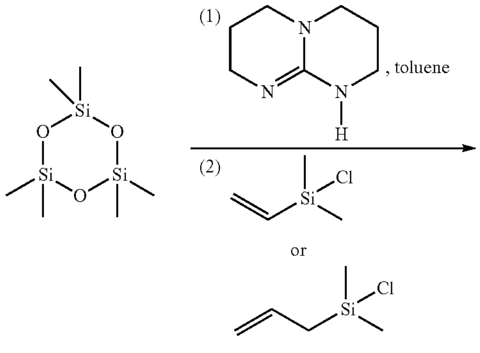

-continued

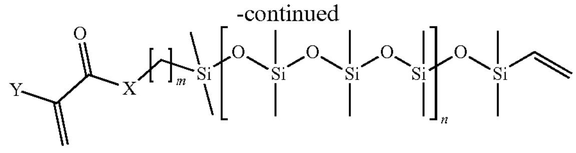

(C)

or

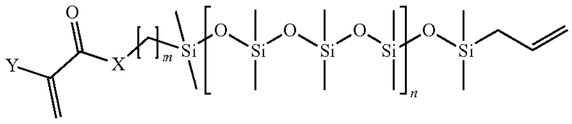

(D)

n = 1 to 100 m = 1 to 10

X = NH or O

Y = H or $CH_3$

In an illustrative embodiment, ethylenically unsaturated reactive end groups include by way of example, (meth)acrylate end groups, vinyl end groups, acrylamide end groups and the like. In one embodiment, an ethylenically unsaturated reactive end group is a methacrylate-containing reactive end group. Suitable methacrylate-containing reactive end groups can be those represented by the structure:

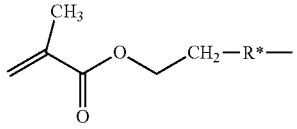

wherein R* is a linking group or bond. Suitable linking groups include, for example, any divalent hydrocarbon radical or moiety such as independently straight or branched, substituted or unsubstituted $C_1$-$C_6$ alkyl group, a substituted or unsubstituted $C_3$-$C_{12}$ cycloalkyl group, a substituted or unsubstituted $C_4$-$C_{12}$ cycloalkylalkyl group, a substituted or unsubstituted $C_3$-$C_{12}$ cycloalkenyl group, a substituted or unsubstituted $C_6$-$C_{12}$ aryl group, a substituted or unsubstituted $C_7$-$C_{12}$ arylalkyl group and substituted and an unsubstituted ether-containing group.

In accordance with another illustrative embodiment, an ophthalmic device which is a polymerization product of a monomeric mixture comprises:

(a) one or more of the multifunctional crosslinking agents described herein;

(b) one or more first ophthalmic device-forming comonomers having at least one reactive group that preferentially reacts with the (meth)acrylate-containing reactive end group or the acrylamide-containing reactive end group of the multifunctional crosslinking agent; and (c) one or more second ophthalmic device-forming comonomer having at least one reactive group that preferentially reacts with the allyl-containing reactive end group or the vinyl-containing reactive end group of the multifunctional crosslinking agent The ophthalmic devices described herein are intended for direct contact with body tissue or body fluid. As used herein, the term "ophthalmic device" refers to devices that reside in or on the eye. These ophthalmic devices can provide optical correction, wound care, drug delivery, diagnostic functionality or cosmetic enhancement or effect or a combination of these properties. Useful ophthalmic devices include, but are not limited to, ophthalmic lenses such as soft contact lenses, e.g., a soft, hydrogel lens, a soft, non-hydrogel lens and the like, hard contact lenses, e.g., a hard, gas permeable lens material and the like, intraocular lenses, overlay lenses, ocular inserts, optical inserts and the like. As is understood by one skilled in the art, a lens is considered to be "soft" if it can be folded back upon itself without breaking.

In an illustrative embodiment, the one or more multifunctional crosslinking agents described herein are present in the monomeric mixture in an ophthalmic device-forming amount. In one embodiment, the one or more multifunctional crosslinking agents described herein are present in the monomeric mixture in an amount of about 1 to about 50 wt. %, based on the total weight of the monomeric mixture. In another embodiment, the one or more multifunctional crosslinking agents described herein are present in the monomeric mixture in an amount of about 1 to about 30 wt. %, based on the total weight of the monomeric mixture.

In an illustrative embodiment, a first ophthalmic device-forming comonomer is an ophthalmic device-forming comonomer having at least one reactive group that can preferentially react with the (meth)acrylate-containing reactive end group or the acrylamide-containing reactive end group. In non-limiting illustrative embodiments, a first ophthalmic device-forming comonomer is one or more silicone ophthalmic device-forming comonomers.

In an illustrative embodiment, a suitable silicone ophthalmic device-forming comonomer is a non-bulky organosilicon-containing monomer comprising a compound represented by a structure of Formula I.

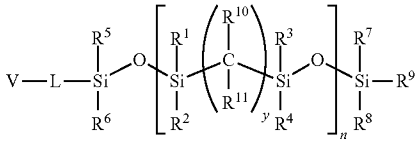

(I)

wherein V is an ethylenically unsaturated polymerizable group, L is a linker group or a bond; $R^1$, $R^2$, $R^3$, $R^4$, $R^5$, $R^6$, $R^7$, $R^8$ and $R^9$ are independently H, a $C_1$ to $C_{12}$ alkyl group, a halo alkyl group, a $C_3$ to $C_{12}$ cycloalkyl group, a heterocycloalkyl group, a $C_2$ to $C_{12}$ alkenyl group, a haloalkenyl group, or a $C_6$ to $C_{12}$ aromatic group; $R^{10}$ and $R^{11}$ are independently H or a $C_1$ to $C_{12}$ alkyl group, wherein at least one of $R^{10}$ and $R^{11}$ is hydrogen; y is 2 to 7 and n is 1 to 100 or from 1 to 20.

Suitable ethylenically unsaturated polymerizable groups include, for example, (meth)acrylates, vinyl carbonates, 0-vinyl carbamates, N-vinyl carbamates, and (meth)acrylamides.

Linker groups can be any divalent radical or moiety and include, for example, a substituted or unsubstituted $C_1$ to $C_{12}$ alkyl group, an alkyl ether group, an alkenyl group, an alkenyl ether group, a halo alkyl group, a substituted or unsubstituted siloxane group, and monomers capable of propagating ring opening.

In one embodiment, V is a (meth)acrylate, L is a $C_1$ to $C_{12}$ alkylene group, $R^1$, $R^2$, $R^3$, $R^4$, $R^5$, $R^6$, $R^7$, $R^8$, and $R^9$ are independently a $C_1$ to $C_{12}$ alkyl group, $R^{10}$ and $R^{11}$ are independently H, y is 2 to 7 and n is 3 to 8.

In one embodiment, V is a (meth)acrylate, L is a $C_1$ to $C_6$ alkyl group, $R^1$, $R^2$, $R^3$, $R^4$, $R^5$, $R^6$, $R^7$, $R^8$, and $R^9$ are independently a $C_1$ to $C_6$ alkyl group, $R^{10}$ and $R^{11}$ are independently H, y is 2 to 7 and n is 1 to 20.

Non-bulky organosilicon-containing monomers represented by a structure of Formula I are known in the art, see, e.g., U.S. Pat. Nos. 7,915,323, 7,994,356, 8,420,711, 8,827,447 and 9,039,174, the contents of which are incorporated by reference herein.

In an illustrative embodiment, a suitable silicone ophthalmic device-forming comonomer is a non-bulky organosilicon-containing monomer comprising a compound represented by a structure of Formula II.

(II)

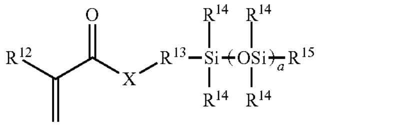

wherein $R^{12}$ is H or methyl; X is O or $NR^{16}$; wherein $R^{16}$ is selected from H, or a $C_1$ to $C_4$ alkyl group, which may be further substituted with one or more hydroxyl groups, and in some embodiments is H or methyl; $R^{13}$ is a divalent alkyl group, which may further be functionalized with a group selected from the group consisting of ether groups, hydroxyl groups, carbamate groups and combinations thereof, and in another embodiment $C_1$ to $C_6$ alkylene groups which may be substituted with ether, hydroxyl and combinations thereof, and in yet another embodiment $C_1$ or $C_3$ to $C_4$ alkylene groups which may be substituted with ether, hydroxyl and combinations thereof, each $R^{14}$ is independently a phenyl or $C_1$ to $C_4$ alkyl which may be substituted with fluorine, hydroxyl or ether, and in another embodiment each $R^{14}$ is independently selected from ethyl and methyl groups, and in yet another embodiment, each $R^{14}$ is methyl; $R^{15}$ is a $C_1$ to $C_4$ alkyl group; a is 2 to 50, and in some embodiments 5 to 15.

Non-bulky organosilicon-containing monomers represented by a structure of Formula II are known in the art, see, e.g., U.S. Pat. Nos. 8,703,891, 8,937,110, 8,937,111, 9,156,934 and 9,244,197, the contents of which are incorporated by reference herein.

Representative examples of the non-bulky organosilicon-containing monomers represented by a structure of Formula II include:

M1EDS6: a compound having the structure and available from Gelest:

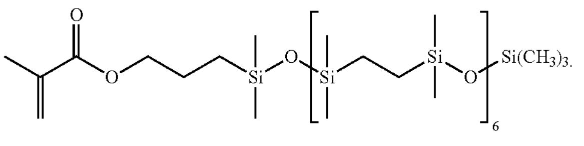

MCR-M11: a compound having the structure:

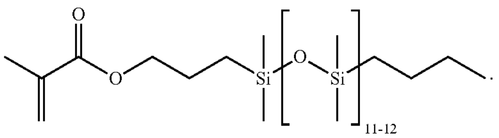

M1-MCR-$C_{12}$: a compound having the structure:

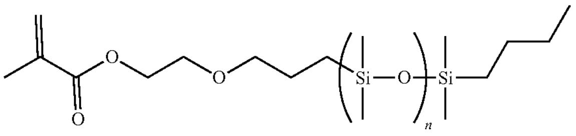

wherein n is an average of 12.

In an illustrative embodiment, a suitable silicone ophthalmic device-forming comonomer is a polysiloxane prepolymer represented by a structure of Formula III:

(III)

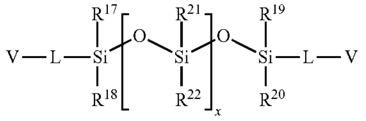

wherein each V is an independently reactive functional end group and includes, by way of example, a hydroxyl-containing reactive functional end group, and an amine-containing reactive functional end group, $R^{17}$ to $R^{22}$ are independently straight or branched, substituted or unsubstituted $C_1$-$C_{30}$ alkyl group, a substituted or unsubstituted $C_3$-$C_{30}$ cycloalkyl group, a substituted or unsubstituted $C_4$-$C_{30}$ cycloalkylalkyl group, a substituted or unsubstituted $C_3$-$C_{30}$ cycloalkenyl group, a substituted or unsubstituted $C_6$-$C_{30}$ aryl group, and a substituted or unsubstituted $C_7$-$C_{30}$ arylalkyl group, and L is independently a linking group.

A hydroxyl-containing reactive functional end groups for use herein is a group of the general formula —OH. Representative examples of amine-containing reactive functional end groups for use herein include, by way of example, an amine having the following general formula —$NHR^{23}$ wherein $R^{23}$ is independently hydrogen or an alkyl group, aryl group, and cycloalkyl group as defined herein and the like.

Linking group L is independently a straight or branched alkyl group, cycloalkyl group, an aryl group, an ether or polyether group, and an ester group as defined herein.

Representative examples of alkyl groups for use herein include, by way of example, a straight or branched alkyl chain radical containing carbon and hydrogen atoms of from 1 to about 30 carbon atoms or from 1 to about 12 carbon atoms or from 1 to about 6 carbon atoms with or without unsaturation, to the rest of the molecule, e.g., methyl, ethyl, n-propyl, 1-methylethyl (isopropyl), n-butyl, n-pentyl, methylene, ethylene, etc., and the like optionally containing one or more heteroatoms, e.g., O and N, and the like.

Representative examples of cycloalkyl groups for use herein include, by way of example, a substituted or unsubstituted non-aromatic mono or multicyclic ring system of about 3 to about 30 carbon atoms or from 3 to about 12 carbon atoms or from 3 to about 6 carbon atoms such as, for example, cyclopropyl, cyclobutyl, cyclopentyl, cyclohexyl, perhydronapththyl, adamantyl and norbornyl groups, bridged cyclic groups or spirobicyclic groups, e.g., spiro-(4,4)-non-2-yl and the like, optionally containing one or more heteroatoms, e.g., O and N, and the like.

Representative examples of cycloalkylalkyl groups for use herein include, by way of example, a substituted or unsubstituted cyclic ring-containing radical containing from about 4 to about 30 carbon atoms or from 3 to about 6 carbon atoms directly attached to the alkyl group which are then attached to the main structure of the monomer at any carbon from the alkyl group that results in the creation of a stable structure such as, for example, cyclopropylmethyl, cyclobutylethyl, cyclopentylethyl and the like, wherein the cyclic ring can optionally contain one or more heteroatoms, e.g., O and N, and the like.

Representative examples of cycloalkenyl groups for use herein include, by way of example, a substituted or unsubstituted cyclic ring-containing radical containing from about 3 to about 30 carbon atoms or from 3 to about 6 carbon atoms with at least one carbon-carbon double bond such as, for example, cyclopropenyl, cyclobutenyl, cyclopentenyl and the like, wherein the cyclic ring can optionally contain one or more heteroatoms, e.g., O and N, and the like.

Representative examples of aryl groups for use herein include, by way of example, a substituted or unsubstituted monoaromatic or polyaromatic radical containing from about 6 to about 30 carbon atoms or from about 6 to about 12 carbon atoms such as, for example, phenyl, naphthyl, tetrahydronapthyl, indenyl, biphenyl and the like, optionally containing one or more heteroatoms, e.g., O and N, and the like.

Representative examples of arylalkyl groups for use herein include, by way of example, a substituted or unsubstituted aryl group as defined herein directly bonded to an alkyl group as defined herein, e.g., $-CH_2C_6H_5$, $-C_2H_4C_6H_5$ and the like, wherein the aryl group can optionally contain one or more heteroatoms, e.g., O and N, and the like.

Representative examples of ester groups for use herein include, by way of example, a carboxylic acid ester having one to 20 carbon atoms and the like.

Representative examples of ether or polyether containing groups for use herein include, by way of example, an alkyl ether, cycloalkyl ether, cycloalkylalkyl ether, cycloalkenyl ether, aryl ether, arylalkyl ether wherein the alkyl, cycloalkyl, cycloalkylalkyl, cycloalkenyl, aryl, and arylalkyl groups are as defined herein. Exemplary ether or polyether-containing groups include, by way of example, alkylene oxides, poly(alkylene oxide)s such as ethylene oxide, propylene oxide, butylene oxide, poly(ethylene oxide)s, poly (ethylene glycol)s, poly(propylene oxide)s, poly(butylene oxide)s and mixtures or copolymers thereof, an ether or polyether group of the general formula $-(R^{14}OR^{15})_t$, wherein $R^{14}$ is a bond, a substituted or unsubstituted alkyl, cycloalkyl or aryl group as defined herein and $R^{15}$ is a substituted or unsubstituted alkyl, cycloalkyl or aryl group as defined herein and t is at least 1, and the like.

A representative example of a polysiloxane prepolymer is as follows:

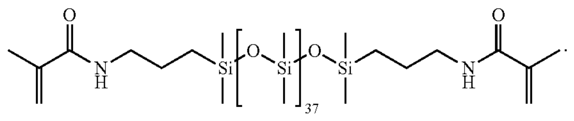

Methods for making the polysiloxane prepolymers described herein are well known and within the purview of one skilled in the art. In addition, the polysiloxane prepolymers are also commercially available from such sources as, for example, Gelest, Silar, Shin-Etsu, Momentive and Siltech.

In an illustrative embodiment, a suitable silicone ophthalmic device-forming comonomer is a bulky siloxane monomer is a compound represented by the structure of Formula IV:

(IV)

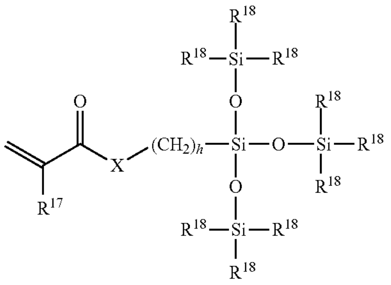

wherein X denotes —O— or $-NR^{19}-$; wherein $R^{19}$ is hydrogen or a $C_1$-$C_4$ alkyl group; each $R^{17}$ independently denotes hydrogen or methyl; each $R^8$ independently denotes a lower alkyl radical such as a $C_1$-$C_6$ alkyl radical, a phenyl radical or a group represented by:

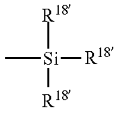

wherein each $R^{18'}$ independently denotes a lower alkyl radical such as a $C_1$-$C_6$ alkyl, or a phenyl radical; and h is 1 to 10.

In an illustrative embodiment, a suitable silicone ophthalmic device-forming comonomer is a bulky siloxane monomer is represented by the structure of Formula V:

(V)

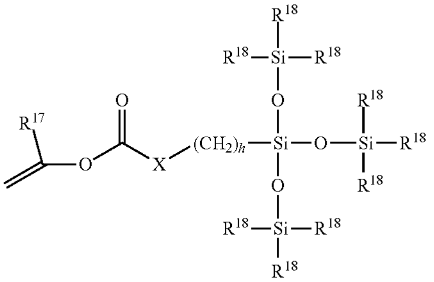

wherein X denotes $-NR^{19}-$; wherein $R^{19}$ denotes hydrogen or a $C_1$-$C_4$ alkyl group; $R^{17}$ denotes hydrogen or methyl; each $R^{18}$ independently denotes a lower alkyl radical such as a $C_1$-$C_6$ alkyl, a phenyl radical or a group represented by:

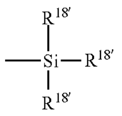

wherein each $R^{18'}$ independently denotes a lower alkyl radical such as a $C_1$-$C_6$ alkyl, or a phenyl radical; and h is 1 to 10.

Representative examples of one or more bulky siloxane monomers include, for example, methacryloxypropyl tris (trimethylsiloxy)silane (TRIS), pentamethyldisiloxanyl methylmethacrylate, tris(trimethylsiloxy)methacryloxy propylsilane, phenyltretramethyl-disloxanylethyl acrylate, methyldi(trimethylsiloxy)methacryloxymethyl silane, 3-[tris(trimethylsiloxy)silyl]propyl vinyl carbamate (TRIS-VC), 3-[tris(trimethylsiloxy)silyl]propyol allyl carbamate, 3-[tris(trimethylsiloxy)silyl]propyl vinyl carbonate and mixtures thereof.

In an illustrative embodiment, the first ophthalmic device-forming comonomer can be present in the monomeric mixture in an amount ranging from about 1 wt. % to about 80 wt. %, based on the total weight of the monomeric mixture. In another illustrative embodiment, the first ophthalmic device-forming comonomer can be present in the monomeric mixture in an amount ranging from about 1 wt. % to about 60 wt. %, based on the total weight of the monomeric mixture.

In an illustrative embodiment, a second ophthalmic device-forming comonomer having at least one reactive group that can preferentially react with the allyl-containing reactive end group or the vinyl-containing reactive end group of the multifunctional crosslinking agent is a hydrophilic ophthalmic device-forming comonomer. Accordingly, in one non-limiting illustrative embodiment, the hydrophilic monomer is a N-vinyl lactam selected from the group consisting of N-vinyl pyrrolidone (NVP), N-vinyl piperidone and N-vinyl-F-caprolactam and mixtures thereof. Other suitable hydrophilic vinyl monomers include N-vinylimidazolidone, N-vinylsuccinimide and N-vinylformamide. In an illustrative embodiment, a second ophthalmic device-forming comonomer is NVP.

In other non-limiting illustrative embodiments, a hydrophilic comonomer can include one or more of unsaturated carboxylic acids, amides, polymerizable amines, vinyl carbonates, vinyl carbamates, oxazolone monomers, copolymers thereof and the like and mixtures thereof. Useful amides include acrylamides such as N,N-dimethylacrylamide and N,N-dimethylmethacrylamide. Examples of other hydrophilic comonomers include hydrophilic prepolymers such as poly(alkene glycols) functionalized with polymerizable groups. Examples of useful functionalized poly(alkene glycols) include poly(diethylene glycols) of varying chain length containing monomethacrylate or dimethacrylate end caps. In an embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art.

In an illustrative embodiment, the second ophthalmic device-forming comonomer can be present in the monomeric mixture in an amount ranging from about 1 wt. % to about 80 wt. %, based on the total weight of the monomeric mixture. In another illustrative embodiment, the second ophthalmic device-forming comonomer can be present in the monomeric mixture in an amount ranging from about 1 wt. % to about 60 wt. %, based on the total weight of the monomeric mixture.

In non-limiting illustrative embodiments, the monomeric mixture may further include one or more hydrophobic monomers. Suitable hydrophobic monomers include ethylenically unsaturated hydrophobic monomers such as, for example, (meth)acrylates-containing hydrophobic monomers, N-alkyl (meth)acrylamides-containing hydrophobic monomers, alkyl vinylcarbonates-containing hydrophobic monomers, alkyl vinylcarbamates-containing hydrophobic monomers, fluoroalkyl (meth)acrylates-containing hydrophobic monomers, N-fluoroalkyl (meth)acrylamides-containing hydrophobic monomers, N-fluoroalkyl vinylcarbonates-containing hydrophobic monomers, N-fluoroalkyl vinylcarbamates-containing hydrophobic monomers, silicone-containing (meth)acrylates-containing hydrophobic monomers, (meth)acrylamides-containing hydrophobic monomers, vinyl carbonates-containing hydrophobic monomers, vinyl carbamates-containing hydrophobic monomers, styrenic-containing hydrophobic monomers, polyoxypropylene (meth)acrylate-containing hydrophobic monomers and the like and mixtures thereof.

In an illustrative embodiment, the one or more hydrophobic monomers are represented by the structure of Formula VI:

(VI)

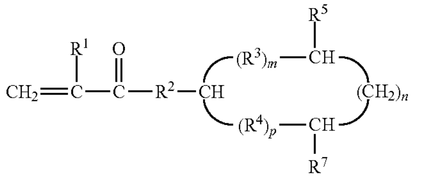

wherein $R^1$ is methyl or hydrogen; $R^2$ is —O— or —NH—; $R^3$ and $R^4$ are independently a divalent radical selected from the group consisting of $—CH_2—$, —CHOH— and $—CHR^6—$; $R^5$ and $R^6$ are independently a branched $C_3$-$C_8$ alkyl group; $R^7$ is hydrogen or —OH; n is an integer of at least 1, and m and p are independently 0 or an integer of at least 1, provided that the sum of m, p and n is 2, 3, 4 or 5.

Representative examples of one or more hydrophobic monomers represented by the structure of Formula VI include, but are not limited to, 4-t-butyl-2-hydroxycyclohexyl methacrylate (TBE); 4-t-butyl-2-hydroxycyclopentyl methacrylate; 4-t-butyl-2-hydroxycyclohexyl methacrylamide (TBA); 6-isopentyl-3-hydroxycyclohexyl methacrylate; 2-isohexyl-5-hydroxycyclopentyl methacrylamide, 4-t-butylcyclohexyl methacrylate, isobornyl methacrylate, adamntyl methacrylate, n-butyl methacrylate, n-hexyl methacrylate, lauryl methacrylate, benzyl methacrylate, and the like. In one embodiment, one or more hydrophobic monomers (b) include compounds of Formula VI wherein $R^3$ is $—CH_2—$, m is 1 or 2, p is 0, and the sum of m and n is 3 or 4.

In an illustrative embodiment, the one or more hydrophobic monomers will be present in the monomeric mixture in an amount ranging from about 0.5 to about 25 wt. %, based on the total weight of the monomeric mixture. In another illustrative embodiment, the one or more hydrophobic monomers will be present in the monomeric mixture in an amount ranging from about 1 to about 10 wt. %, based on the total weight of the monomeric mixture.

The monomeric mixture may further contain, as necessary and within limits not to impair the purpose and effect of the present disclosure, various additives such as antioxidants, wetting agents, toughening agents and the like and other additives as is well known in the art.

Suitable wetting agents include, for example, glycerin, propylene glycol, mono or disaccharide, polyethylene glycol, ethoxylated glucose, and combinations thereof. In one embodiment, a suitable wetting agent can be a polymer containing carboxylic acid functionality, such as a polymer containing polyacrylic acid (PAA). Specific coating wetting agents include P(vinylpyrrolidinone) (PVP)-co-acrylic acid (AA)), P(methylvinylether-alt-maleic acid), P(acrylic acid-graft-ethyleneoxide), P(acrylic acid-co-methacrylic acid), P(acrylamide-co-AA), P(acrylamide-co-AA), P(AA-co-maleic), P(butadiene-maleic acid) and P(N-vinylpyrrolidone-co-vinyl acetate), and polyvinylalcohol.

In another illustrative embodiment, the monomeric mixture further includes one or more ultraviolet (UV) blockers. In one illustrative embodiment, suitable UV blockers include, for example, one or more compounds of the following formulae:

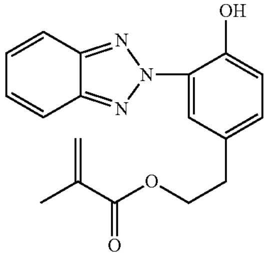

,

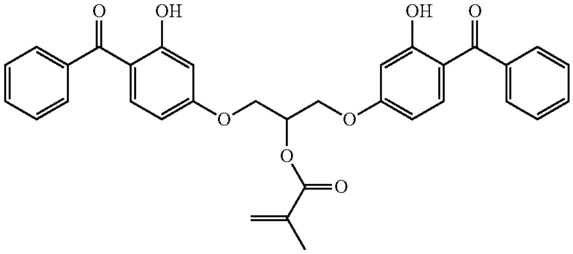

(2-Propenoic acid, 2-methyl,2-(4-benzoyl-3-hydroxyphenoxy)-1-[(4-benzoyl3-hydroxyphenoxy)methyl ester),

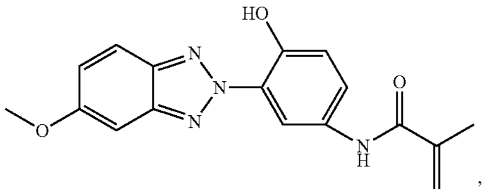

,

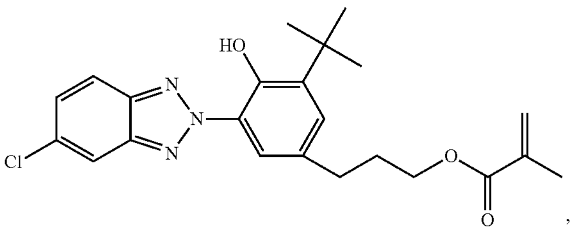

,

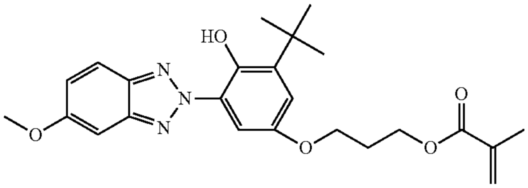

, and

-continued

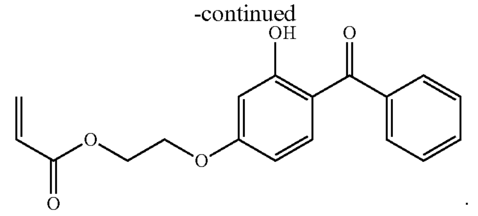

.

These compounds are merely illustrative and not intended to be limiting. Any known UV blocker or later developed UV blocker are contemplated for use herein.

The ophthalmic devices of the illustrative embodiments, e.g., contact lenses or intraocular lenses, can be prepared by polymerizing the foregoing monomeric mixtures to form a product that can be subsequently formed into the appropriate shape by, for example, lathing, injection molding, compression molding, cutting and the like. For example, in producing contact lenses, the initial mixture may be polymerized in tubes to provide rod-shaped articles, which are then cut into buttons. The buttons may then be lathed into contact lenses.

Alternately, the ophthalmic devices such as contact lenses may be cast directly in molds, e.g., polypropylene molds, from the mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the mixtures to be polymerized to a mold, and spinning the mold in a controlled manner while exposing the mixture to a radiation source such as UV light. Static casting methods involve charging the monomeric mixture between two mold sections, one mold section shaped to form the anterior lens surface and the other mold section shaped to form the posterior lens surface, and curing the mixture while retained in the mold assembly to form a lens, for example, by free radical polymerization of the mixture. Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a monomeric mixture is cured by spincasting in a mold to form a shaped article having an anterior lens surface and a relatively large thickness, and the posterior surface of the cured spincast article is subsequently lathed to provide a contact lens having the desired thickness and posterior lens surface.

Polymerization may be facilitated by exposing the monomeric mixture to heat and/or radiation, such as ultraviolet light, visible light, or high energy radiation. A polymerization initiator may be included in the mixture to facilitate the polymerization step. Representative examples of free radical thermal polymerization initiators include organic peroxides such as acetyl peroxide, lauroyl peroxide, decanoyl peroxide, stearoyl peroxide, benzoyl peroxide, tertiarylbutyl peroxypivalate, peroxydicarbonate, and the like. Representative UV initiators are those known in the art and include benzoin methyl ether, benzoin ethyl ether, Darocure® 1173, 1164, 2273, 1116, 2959, 3331 (EM Industries) and Irgacure© 651 and 184 (Ciba-Geigy), 2,2'Azobis(2-methylpropionitrile) (VAZO 64) and the like. Generally, the initiator will be employed in the monomeric mixture at a concentration of about 0.01 to about 5 percent by weight of the total mixture.

Polymerization can be performed in a reaction medium, such as, for example, a solution or dispersion using a solvent, e.g., tetrahydrofuran or toluene. Alternatively, polymerization can be bulk polymerization.

Generally, polymerization can be carried out for about 15 minutes to about 72 hours, and under an inert atmosphere of, for example, nitrogen or argon. If desired, the resulting polymerization product can be dried under vacuum, e.g., for about 5 to about 72 hours or left in an aqueous solution prior to use.

Polymerization of the mixtures will yield a polymer, that when hydrated, preferably forms a hydrogel. When producing a hydrogel lens, the mixture may further include at least a diluent that is ultimately replaced with water when the polymerization product is hydrated to form a hydrogel. Generally, the water content of the hydrogel is as described hereinabove, i.e., at least about 45 weight percent, or at least about 50 weight percent. The amount of diluent used should be less than about 50 weight percent and in most cases, the diluent content will be less than about 30 weight percent. However, in a particular polymer system, the actual limit will be dictated by the solubility of the various monomers in the diluent. In order to produce an optically clear copolymer, it is important that a phase separation leading to visual opacity does not occur between the comonomers and the diluent, or the diluent and the final copolymer.

Furthermore, the maximum amount of diluent which may be used will depend on the amount of swelling the diluent causes the final polymers. Excessive swelling will or may cause the copolymer to collapse when the diluent is replaced with water upon hydration. Suitable diluents include, but are not limited to, ethylene glycol; glycerine; liquid poly(ethylene glycol); alcohols; alcohol/water mixtures; ethylene oxide/propylene oxide block copolymers; low molecular weight linear poly(2-hydroxyethyl methacrylate); glycol esters of lactic acid; formamides; ketones; dialkylsulfoxides; butyl carbitol; boric acid esters of polyhydric alcohols such as boric acid esters of glycerol and the like and mixtures thereof.

If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. If desired, the mixture used to produce the hydrogel lens may further include crosslinking and wetting agents known in the prior art for making hydrogel materials.

In the case of intraocular lenses, the monomeric mixtures to be polymerized may further include a monomer for increasing the refractive index of the resultant polymerized product. Examples of such monomers include aromatic (meth) acrylates, such as phenyl (meth)acrylate, 2-phenylethyl (meth)acrylate, 2-phenoxyethyl methacrylate, and benzyl (meth)acrylate.

The ophthalmic devices such as contact lenses obtained herein may be subjected to optional machining operations. For example, the optional machining steps may include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

The lens may then be transferred to individual lens packages containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative. The examples should not be read as limiting the scope of the invention as defined in the claims.

In the examples, the following abbreviations are used.

TBD: 1,5,7-triazabicyclo[4.4.0]dec-5-ene.

EDS: 1,1,4,4-tetramethyl-1,4-disila-5-oxacyclopentane.

D3: hexamethylcyclotrisiloxane.

DMA: N,N-dimethylacrylamide.

HEMA: 2-hydroxyethyl methacrylate.

NVP: N-vinyl-2-pyrrolidone.

EGDMA: Ethylene glycol dimethacrylate.

TRIS: 3-[Tris(trimethylsiloxy)silyl]propyl methacrylate.

UV416: 2-(4-Benzoyl-3-hydroxyphenoxy)ethyl acrylate.

Irgacure 819: a photoinitiator for free radical polymerization available from Sigma Aldrich.

IMVT: 1,4-bis(4-(2-methacryloxyethyl)phenylamino)anthraquinone.

IPA: Isopropyl alcohol.

Ma2D37: a compound having the following structure and available from Shin-Etsu and Gelest:

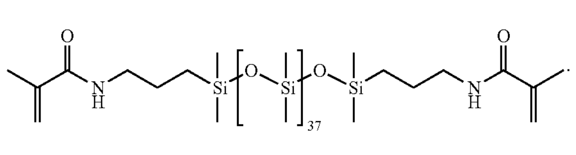

M1EDS6: a compound having the following structure and available from Gelest:

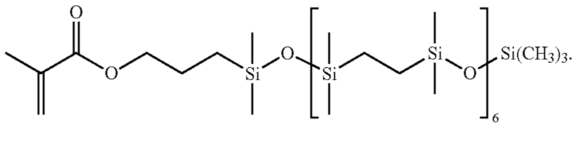

Various polymerization products were formed as discussed below and characterized by standard testing procedures such as:

Water %: Two sets of six hydrated lenses or films are blotted dry on a piece of filter paper to remove excess water, and samples are weighed (wet weight). Samples are then placed in a microwave oven for 10 minutes inside ajar containing desiccant. The samples are then allowed to sit for 30 minutes to equilibrate to room temperature and reweighed (dry weight). The percent water is calculated from the wet and dry weights.

Contact Angle: Captive bubble contact angle data was collected on a First Ten Angstroms FTA-1000 prop Shape Instrument. All samples were rinsed in HPLC grade water prior to analysis in order to remove components of the packaging solution from the sample surface. Prior to data collection the surface tension of the water used for all experiments was measured using the pendant drop method. In order for the water to qualify as appropriate for use, a surface tension value of 70-72 dynes/cm was expected. All lens samples were placed onto a curved sample holder and submerged into a quartz cell filled with HPLC grade water. Advancing and receding captive bubble contact angles were collected for each sample. The advancing contact angle is defined as the angle measured in water as the air bubble is retracting from the lens surface (water is advancing across the surface). All captive bubble data was collected using a high-speed digital camera focused onto the sample/air bubble interface. The contact angle was calculated at the digital frame just prior to contact line movement across the sample/air bubble interface. The receding contact angle is defined as the angle measured in water as the air bubble is expanding across the sample surface (water is receding from the surface).

Modulus ($g/mm^2$) was measured per ASTM 1708 employing an Instron (Model 4502) instrument where the film sample was immersed in borate buffered saline; an appropriate size of the film sample was gauge length 22 mm and width 4.75 mm, where the sample further has ends forming a dogbone shape to accommodate gripping of the sample with clamps of the Instron instrument, and a thickness of 100±50 microns.

Extractable Test, PVP and Silicone: The resultant monomeric mixtures were cast into contact lenses by introducing the monomeric mixture to a polypropylene mold assembly. Then, the mold assembly and monomeric mixture were UV-cured for about—0.5 hours to form a contact lens. The lenses were dried released and submitted to extractable study directly. The lenses were extracted by hot IPA in Soxhlet extraction for 24 hr. The collected IPA was concentrated and submitted to HPLC measurement to identify the weight ratio of extractable components.

UV-Vis Transmittance: Lenses were individually placed onto a horizontal integrating sphere for contact lens measurement. The transmittance spectrum was obtained from 200 nm to 800 nm.

Example 1

Preparation of Allyl-$(EDS)_{10}$-M1 (where n=10) crosslinking agent according to the following reaction scheme.

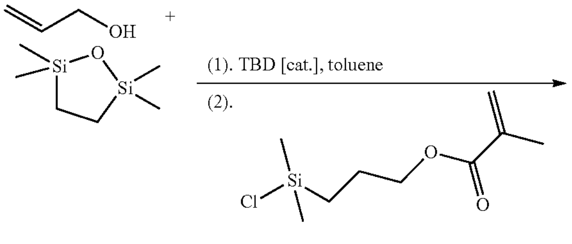

-continued

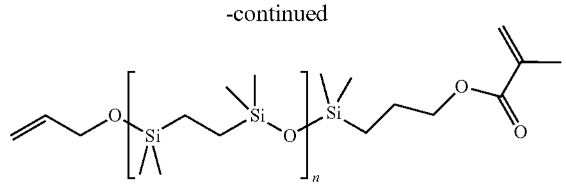

A 100-mL flask equipped with a stirrer was dried under vacuum with a heat gun. Anhydrous toluene (40 mL) was injected into the flask with a syringe. The flask was transferred into a nitrogen-filled glovebox. Next, TBD (868 mg, 6.24 mmol, 1 equiv.) and allyl alcohol (434 mg, 7.48 mmol, 1.2 equiv.) were added into the flask in the glovebox. The flask was removed from the glovebox. After stirring the solution for 15 min, EDS (10 g, 62.4 mmol, 10 equiv.) was injected into the solution with a syringe. The mixture was allowed to stir for 30 min. Next, 3-(dimethylchlorosilyl) propyl methacrylate (1790 mg, 8.1 mmol, 1.3 equiv.) and anhydrous pyridine (987 mg, 12.5 mmol, 2 equiv.) were added into the solution. The solution was stirred overnight. The solution was washed with 10% sodium bicarbonate solution (50 mL) and the organic layer was collected and concentrated. The concentrated solution was precipitated in methanol three times and the bottom layer was collected and dried under vacuum to afford Allyl-$(EDS)_{10}$-M1 of transparent viscous liquid (8.5 g).

Example 2

The general synthesis procedure of Example 1 was used except the EDS monomer was replaced with the D3 monomer to obtain the Allyl-$(D3)_{10}$-M1 crosslinking agent.

Example 3

Preparation of Allyl-EO1-$(EDS)_{10}$-M1 (where n=10) crosslinking agent according to the following reaction scheme.

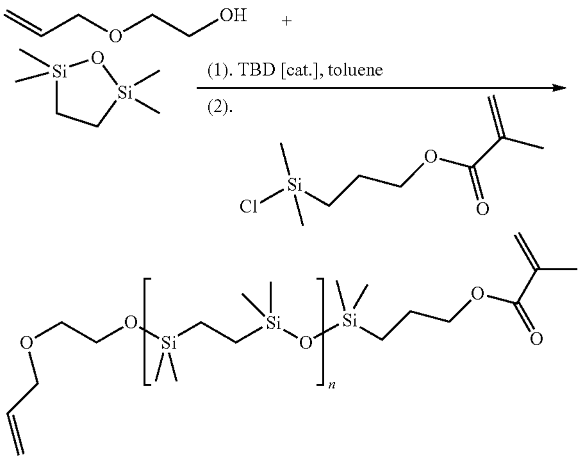

A 100-mL flask equipped with a stirrer was dried under vacuum with a heat gun. Anhydrous toluene (20 mL) was injected into the flask with a syringe. The flask was transferred into a nitrogen-filled glovebox. Next, TBD (556 mg, 4 mmol, 1 equiv.) and 2-allyoxyethanol (490 mg, 4.8 mmol, 1.2 equiv.) were added into the flask in the glovebox. The flask was removed from the glovebox. After stirring the solution for 15 min, EDS (6.4 g, 40 mmol, 10 equiv.) was injected into the solution with a syringe. The mixture was allowed to stir for 30 min. Next, 3-(dimethylchlorosilyl) propyl methacrylate (1148 mg, 5.2 mmol, 1.3 equiv.) and anhydrous pyridine (633 mg, 8 mmol, 2 equiv.) were added into solution. The solution was stirred overnight. The solution was washed with water (50 mL) and the organic layer was collected and concentrated. The concentrated solution was precipitated in methanol three times and the bottom layer was collected and dried under vacuum to afford Allyl-EO1-$(EDS)_{10}$-M1 of transparent viscous liquid (3.9 g).

Example 4

The general synthesis procedure of Example 3 was used except the EDS monomer was replaced with the D3 monomer to obtain the Allyl-EO1-$(D3)_{10}$-M1 crosslinking agent.

Example 5

Preparation of VS-$(EDS)_{90}$-M1 (where n=90) crosslinking agent according to the following reaction scheme.

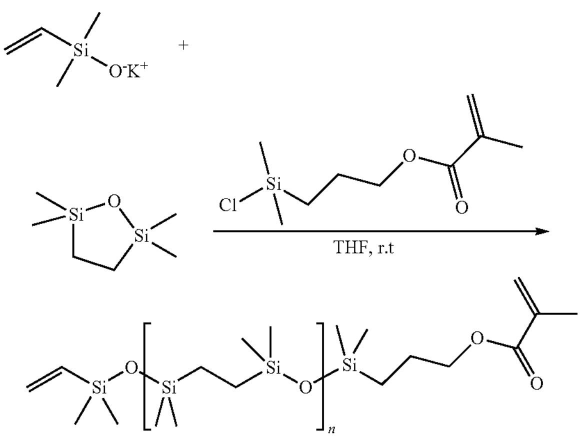

A 200 mL-flask equipped with a stir bar was dried under vacuum with a heat gun. Anhydrous tetrahydrofuran (THF) (100 mL) was injected into the flask with a syringe. The flask was transferred into a nitrogen-filled glovebox. Next, potassium vinyldimethylsilanolate (460 mg, 4 mmol) and 18-crown-6 ether (1056 mg, 4 mmol) were added into the THF solution. The solution was transferred out of the glovebox and stirred for 20 min at room temperature. 1,1,4,4-Tetramethyl-1,4-disila-5-oxacyclopentane (6410 mg, 40 mmol) was injected into the flask with a syringe. The solution was allowed to stir for 30 second and 3-(Dimethylchlorosilyl)propyl methacrylate (971 mg, 4.4 mmol) and anhydrous pyridine (380 mg, 4.8 mmol) were injected into the solution by syringes individually to terminate the polymerization. The solution was then washed with de-ionized water (50 mL) once. The organic layer was precipitated in methanol three time, then the bottom layer was collected and vacuum overnight to afford transparent liquid of VS-(EDS) $_{90}$-M1 (4.1 g).

Example 6

The general synthesis procedure of Example 5 was used except the EDS monomer was replaced with the D3 monomer to obtain the VS-$(D3)_{90}$-M1 crosslinking agent.

Example 7

Preparation of AS-$(EDS)_{10}$-M1 (where n=10) crosslinking agent according to the following reaction scheme.

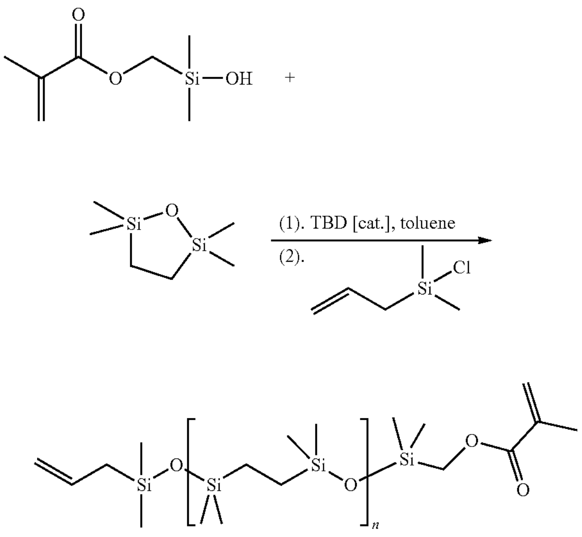

A 50-mL flask equipped with a stirrer was dried under vacuum with a heat gun. Anhydrous toluene (20 mL) was injected into the flask with a syringe. The flask was transferred into a nitrogen-filled glovebox. Next, TBD (557 mg, 4 mmol, 1 equiv.) was added into the flask and stirred for 20 min at room temperature under nitrogen. A vacuum-dried 100-mL flask was injected with 10 mL of anhydrous toluene. (hydroxydimethylsilyl)methyl methacrylate (835 mg, 4.8 mmol, 1.2 equiv.) and 1,1,4,4-tetramethyl-1,4-disila-5-oxacyclopentane (10 g, 62.4 mmol, 10 equiv.) were added into the 100-mL flask. After TBD was fully dissolved into anhydrous toluene, the solution was transferred into the 100-mL flask with a syringe. The solution was stirred for 40 min at room temperature under nitrogen. Allyldimethylchlorosilane (700 mg, 5.2 mmol, 1.3 equiv.) and anhydrous pyridine (633 mg, 8.0 mmol, 2.0 equiv.) were injected into the solution with syringes individually. The solution was stirred for 30 min. The solution was concentrated in a rotovap and precipitated in methanol (50 mL) three times. The bottom organic layer was collected and dried in vacuum overnight to afford viscous transparent liquid of AS-EDS-M1 (4.76 g).

Example 8

Preparation of VS-$(D3)_{10}$-M1 (where X═O, Y═$CH_3$, n=10, m=1) crosslinking agent according to the following reaction scheme.

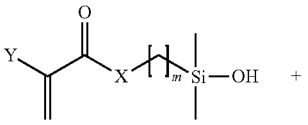

-continued

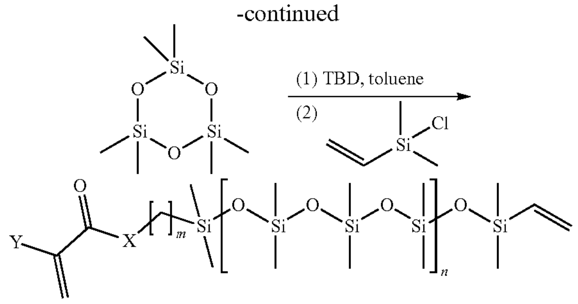

A 25-mL flask equipped with a stirrer was dried under vacuum with a heat gun. Anhydrous toluene (15 mL) was injected into the flask with a syringe. The flask was transferred into a nitrogen-filled glovebox. Next, TBD (696 mg, 5 mmol, 1 equiv.) was added into the flask and stirred for 20 min at room temperature under nitrogen. A vacuum-dried 50-mL flask was injected with 10 mL of anhydrous toluene. Next, (hydroxydimethylsilyl)methyl methacrylate (1044 mg, 6.0 mmol, 1.2 equiv.) and hexamethylcyclotrisiloxane (11.1 g, 50 mmol, 10 equiv.) were added into the 50-mL flask. After TBD was fully dissolved into anhydrous toluene, the solution was transferred into the 50-mL flask with a syringe. The solution was stirred for 60 min at room temperature under nitrogen. Vinyldimethylchlorosilane (784 mg, 6.5 mmol, 1.3 equiv.) and anhydrous pyridine (791 mg, 1.0 mmol, 2.0 equiv.) were injected into the solution with syringes individually. The solution was stirred for 30 min. The solution was concentrated in rotovap and precipitated in acetonitrile (50 mL) once and methanol (50 mL) twice. The bottom organic layer was collected and dried in vacuum overnight to afford viscous transparent liquid of VS-$(D3)_{10}$-M1 (10.2 g).

Example 9

Preparation of AS-$(D3)_{10}$-M1 (where X=O, Y=$CH_3$, n=10, m=1) crosslinking agent according to the following reaction scheme.

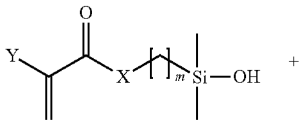

-continued

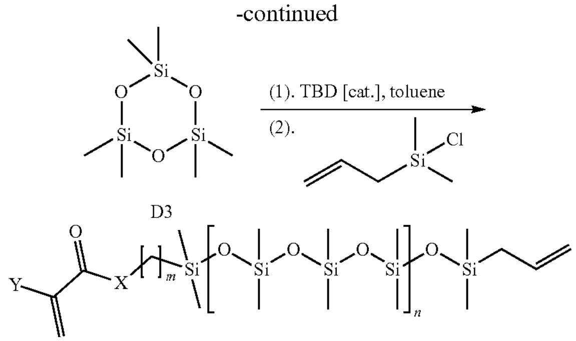

A 25-mL flask equipped with a stirrer was dried under vacuum with a heat gun. Anhydrous toluene (15 mL) was injected into the flask with a syringe. The flask was transferred into a nitrogen-filled glovebox. Next, TBD (696 mg, 5 mmol, 1 equiv.) was added into the flask and stirred for 20 min at room temperature under nitrogen. A vacuum-dried 50-mL flask was injected with 10 mL of anhydrous toluene. Next, (hydroxydimethylsilyl)methyl methacrylate (1044 mg, 6.0 mmol, 1.2 equiv.) and hexamethylcyclotrisiloxane (11.1 g, 50 mmol, 10 equiv.) were added into the 50-mL flask. After TBD was fully dissolved into anhydrous toluene, the solution was transferred into the 50-mL flask with a syringe. The solution was stirred for 60 min at room temperature under nitrogen. Allyldimethylchlorosilane (784 mg, 6.5 mmol, 1.3 equiv.) and anhydrous pyridine (791 mg, 1.0 mmol, 2.0 equiv.) were injected into the solution with syringes individually. The solution was stirred for 30 min. The solution was concentrated in a rotovap and precipitated in acetonitrile (50 mL) once and methanol (50 mL) twice. The bottom organic layer was collected and dried in vacuum overnight to afford viscous transparent liquid of VS-D3-M1 (10.2 g).

Examples 10-20

A monomeric mix was made by mixing the following components, listed in Table 1 at amounts per weight.

TABLE 1

| Formulation | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|
| TRIS | 28 | 28 | 28 | 25 | 25 | 25 | 28 | 25 | 25 | 25 | 25 |
| Ma2D37 | 6 | 7 | 8 | 9 | 10 | 4 | 6 | 8 | 10 | 12 | 14 |
| M1EDS6 | 12 | 12 | 13 | 13 | 14 | 14 | 15 | 15 | 15 | 16 | 16 |
| Al-EO1-EDS-M1 of Example 3 | 3 | 3 | 3 | 3 | 3 | 6 | 6 | 6 | 9 | 9 | 9 |
| NVP | 34 | 34 | 34 | 34 | 34 | 34 | 34 | 34 | 34 | 34 | 34 |
| EGDMA | 0.1 | 0.1 | 0.1 | 0.1 | 0.1 | 0.1 | 0.1 | 0.1 | 0.1 | 0.1 | 0.1 |
| HEMA | 1 | 1 | 1 | 1 | 1 | 1 | 1 | 1 | 1 | 1 | 1 |
| DMA | 7 | 7 | 7 | 7 | 7 | 7 | 7 | 7 | 7 | 7 | 7 |
| Hexanol | 7.38 | 7.38 | 7.38 | 7.38 | 7.38 | 7.38 | 7.38 | 7.38 | 7.38 | 7.38 | 7.38 |
| UV416 | 1 | 1 | 1 | 1 | 1 | 1 | 1 | 1 | 1 | 1 | 1 |
| IMVT | 0.02 | 0.02 | 0.02 | 0.02 | 0.02 | 0.02 | 0.02 | 0.02 | 0.02 | 0.02 | 0.02 |
| Irgacure 819 | 0.50 | 0.50 | 0.50 | 0.50 | 0.50 | 0.50 | 0.50 | 0.50 | 0.50 | 0.50 | 0.50 |

The resultant monomeric mixtures were cast into contact lenses by introducing the monomeric mixture to a polypropylene mold assembly. Then, the mold assembly and monomeric mixture were UV-cured for about 0.5 hours to form a contact lens. The resultant contact lenses were released from the mold assembly, extracted once in 50/50 IPA/water for 10 minutes, once in IPA for 30 minutes, once in 50/50 IPA/ water for 10 minutes, twice in 10000 water for 10 minutes each and placed in a borated buffer solution (BBS) before being autoclaved.

Examples 21-23

A monomeric mix was made by mixing the following components, listed in Table 2 at amounts per weight.

TABLE 2

| Formulation | Ex. 21 | Ex. 22 | Ex. 23 |
|---|---|---|---|
| TRIS | 28 | 28 | 28 |
| Ma2D37 | 6 | 6 | 6 |
| M1EDS6 | 12 | 8 | 3 |
| VS-EDS-M1 of Example 5 | 3 | 7 | 12 |
| NVP | 34 | 34 | 34 |
| EGDMA | 0.1 | 0.1 | 0.1 |
| HEMA | 1 | 1 | 1 |
| DMA | 7 | 7 | 7 |
| Hexanol | 7.38 | 7.38 | 7.38 |
| UV416 | 1 | 1 | 1 |
| IMVT | 0.02 | 0.02 | 0.02 |
| Irgacure 819 | 0.50 | 0.50 | 0.50 |

The resultant monomeric mixtures were cast into contact lenses by introducing the monomeric mixture to a polypropylene mold assembly. Then, the mold assembly and monomeric mixture were UV-cured for about −0.5 hours to form a contact lens. The resultant contact lenses were released from the mold assembly, extracted once in 50/50 IPA/water for 10 minutes, once in IPA for 30 minutes, once in 50/50 IPA/water for 10 minutes, twice in 100% water for 10 minutes each and placed in a borated buffer solution (BBS) before being autoclaved.

Examples 24-29

A monomeric mix was made by mixing the following components, listed in Table 3 at amounts per weight.

TABLE 3

| Formulation | Ex. 24 | Ex. 25 | Ex. 26 | Ex. 27 | Ex. 28 | Ex. 29 |
|---|---|---|---|---|---|---|
| TRIS | 25 | 25 | 28.9 | 25 | 35 | 25 |
| Ma2D37 | 10 | 10 | 14.74 | 20 | 10 | 20 |
| M1EDS6 | 8 | 8 | 6.5 | 5 | 5 | 5 |
| VS-$(D3)_{10}$-M1 of Ex. 8 | 10 | 10 | 4.34 | 10 | 8.5 | 10 |
| NVP | 28 | 34 | 31 | 25.3 | 25 | 26.8 |
| EGDMA | 0 | 0.3 | 0.15 | 0 | 0.3 | 0 |
| HEMA | 5 | 0 | 2.64 | 5 | 0 | 0 |
| DMA | 7 | 3 | 3.82 | 0 | 7 | 7 |
| Hexanol | 5 | 8 | 6.47 | 8 | 8 | 5 |
| UV416 | 1 | 1 | 1 | 1 | 1 | 1 |
| IMVT | 0.02 | 0.02 | 0.02 | 0.02 | 0.02 | 0.02 |
| Irgacure 819 | 0.70 | 0.70 | 0.45 | 0.70 | 0.20 | 0.20 |
| TEST | | | | | | |
| CBCA | — | 36 | 36 | 37 | 41 | 35 |
| Modulus | — | 257 | 177 | — | — | — |

The resultant monomeric mixtures were cast into contact lenses by introducing the monomeric mixture to a polypropylene mold assembly. Then, the mold assembly and monomeric mixture were thermally cured for about 3.0 hours to form a contact lens. The resultant contact lenses were released from the mold assembly, extracted once in 50/50 IPA/water, once in 100% IPA, once in 50/50 IPA/water, and twice in 100% water for 10 minutes each and placed in a borated buffer solution (BBS) before being autoclaved.

Examples 30-32 and Comparative Example A

A monomeric mix was made by mixing the following components, listed in Table 4 at amounts per weight.

TABLE 4

| Formulation | Ex. 30 | Ex. 31 | Ex. 32 | Comp. Ex . A |
|---|---|---|---|---|
| TRIS | 28 | 28 | 28 | 28 |
| Ma2D37 | 6 | 6 | 6 | 6 |
| M1EDS6 | 12 | 8 | 3 | 15 |
| AS-EDS-M1 of Example 7 | 3 | 7 | 12 | 0 |
| NVP | 34 | 34 | 34 | 34 |
| EGDMA | 0.1 | 0.1 | 0.1 | 0.1 |
| HEMA | 1 | 1 | 1 | 1 |
| DMA | 7 | 7 | 7 | 7 |
| Hexanol | 7.38 | 7.38 | 7.38 | 7.38 |
| UV416 | 1 | 1 | 1 | 1 |
| IMVT | 0.02 | 0.02 | 0.02 | 0.02 |
| Irgacure 819 | 0.50 | 0.50 | 0.50 | 0.50 |

The resultant monomeric mixtures were cast into contact lenses by introducing the monomeric mixture to a polypropylene mold assembly. Then, the mold assembly and monomeric mixture were thermally cured for about 3.0 hours to form a contact lens. The resultant contact lenses were released from the mold assembly, extracted once in 50/50 IPA/water, once in 100% IPA, once in 50/50 IPA/water, and twice in 100% water for 10 minutes each and placed in a borated buffer solution (BBS) before being autoclaved.

The test results for the contact lenses made from Examples 30-32 and Comparative Example A are set forth below in Table 5.

TABLE S

| Formulation | Ex. 30 | Ex. 31 | Ex. 32 | Comp. Ex . A |
|---|---|---|---|---|
| Water Content % | 51.87 | 50.86 | 46.31 | 54 |
| CBCA receding | 34 | 34 | 35 | — |
| CBCA advancing | 38 | 42 | 58 | — |
| Modulus (g/mM1) | 51 | 56 | 75 | 50 |
| Extractable Test, PVP | 42.9 | 41.2 | 33.1 | 51.3 |
| Extractable Test, Silicone | 52.2 | 52.3 | 44.7 | 54.1 |
| UV-Vis Transmittance % (316-380 nm/ 280-315 nm) | 24.1 | 24.8 | 22 | — |

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present formulations and are disclosed herein just as if each and every such sub-combination was individually and explicitly disclosed herein.

It will be understood that various modifications may be made to the embodiments disclosed herein. Therefore, the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. An ophthalmic device which is a polymerization product of a monomeric mixture comprising:

(a) one or more multifunctional crosslinking agents comprising one or more repeating units of a siloxanyl group or a silyl-alkyl-siloxanyl group, and at least two ethylenically unsaturated reactive end groups, wherein one of the at least two ethylenically unsaturated reactive end groups is a (meth) acrylate-containing reactive end group or an acrylamide-containing reactive end group and the other one of the at least two ethylenically unsaturated reactive end groups is an allyl-containing reactive end group;

(b) one or more first ophthalmic device-forming comonomers having at least one reactive group that preferentially reacts with the (meth) acrylate-containing reactive end group or the acrylamide-containing reactive end group of the multifunctional crosslinking agent, wherein the one or more first ophthalmic device-forming comonomers comprise one or more silicone-containing comonomers represented by a structure of Formula I:

(I)

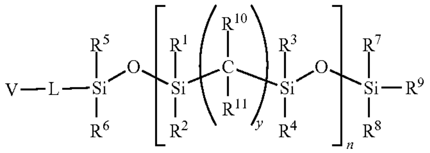

wherein V is an ethylenically unsaturated polymerizable group, L is a linker group or a bond; $R^1$, $R^2$, $R^3$, $R^4$, $R^5$, $R^6$, $R^7$, $R^8$, and $R^9$ are independently H, a $C_1$ to $C_{12}$ alkyl group, a halo alkyl group, a $C_3$ to $C_{12}$ cycloalkyl group, a heterocycloalkyl group, a $C_2$ to $C_{12}$ alkenyl group, a haloalkenyl group, or a $C_6$ to $C_{12}$ aromatic group; $R^{10}$ and $R^{11}$ are independently H or a $C_1$ to $C_{12}$ alkyl group, wherein at least one of $R^{10}$ and $R^{11}$ is hydrogen; y is 2 to 7 and n is 1 to 100; and (c) one or more second ophthalmic device-forming comonomers having at least one reactive group that preferentially reacts with the allyl-containing reactive end group of the multifunctional crosslinking agent.

2. The ophthalmic device according to claim 1, wherein the one or more multifunctional crosslinking agents comprise from 3 to about 300 repeating units of the siloxanyl group.

3. The ophthalmic device according to claim 1, wherein the one or more multifunctional crosslinking agents comprise one or more repeating units of the siloxanyl group represented by the following structure:

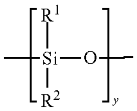

wherein $R^1$ and $R^2$ are independently hydrogen, a $C_1$ to $C_{12}$ alkyl group, a halo alkyl group, a $C_3$ to $C_{12}$ cycloalkyl group, a $C_3$ to $C_{12}$ heterocycloalkyl group, a $C_2$ to $C_{12}$ alkenyl group, a haloalkenyl group, or a $C_6$ to $C_{12}$ aromatic group and y is from 3 to about 300.

4. The ophthalmic device according to claim 1, wherein the one or more multifunctional crosslinking agents comprise 1 to about 100 repeating units of the silyl-alkyl-siloxanyl group, and the alkyl group of the silyl-alkyl-siloxanyl group has from 2 to about 4 carbon atoms.

5. The ophthalmic device according to claim 1, wherein the one or more multifunctional crosslinking agents comprise one or more repeating units of the silyl-alkyl-siloxanyl group represented by the following structure:

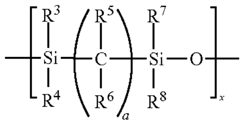

wherein $R^3$, $R^4$, $R^5$, $R^6$, $R^7$, and $R^8$ are independently hydrogen, a $C_1$ to $C_{12}$ alkyl group, a halo alkyl group, a $C_3$ to $C_{12}$ cycloalkyl group, a $C_3$ to $C_{12}$ heterocycloalkyl group, a $C_2$ to $C_{12}$ alkenyl group, a haloalkenyl group, or a $C_6$ to $C_{12}$ aromatic group; a is from 2 to 4 and x is from 1 to about 100.

6. The ophthalmic device according to claim 1, wherein the one or more first ophthalmic device-forming comonomers further comprise one or more additional silicone-containing comonomers.

7. The ophthalmic device according to claim 6, wherein the one or more additional silicone-containing comonomers are selected from the group consisting of a silicone-containing comonomer represented by a structure of Formula II:

(II)

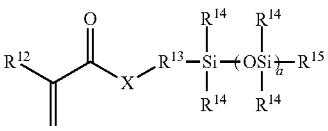

wherein $R^{12}$ is H or methyl; X is O or $NR^{16}$; wherein $R^{16}$ is selected from H, or a $C_1$ to $C_4$ alkyl group, optionally substituted with one or more hydroxyl groups; $R^{13}$ is a divalent alkyl group, optionally functionalized with a group selected from the group consisting of an ether group, a hydroxyl group, a carbamate group and combinations thereof; each $R^{14}$ is independently a phenyl group or a $C_1$ to $C_4$ alkyl group, optionally substituted with fluorine, a hydroxyl group or an ether group; $R^{15}$ is a $C_1$ to $C_4$ alkyl group; and a is 2 to 50, a polysiloxane prepolymer represented by a structure of Formula III:

(III)

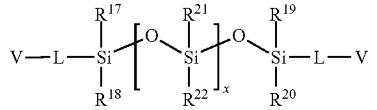

wherein each V is an independently reactive functional end group; $R^{17}$ to $R^{22}$ are independently a straight or branched, substituted or unsubstituted $C_1$-$C_{30}$ alkyl group, a substituted or unsubstituted $C_3$-$C_{30}$ cycloalkyl group, a substituted or unsubstituted $C_4$-$C_{30}$ cycloalkylalkyl group, a substituted or unsubstituted $C_3$-$C_{30}$ cycloalkenyl group, a substituted or unsubstituted $C_6$-$C_{30}$ aryl group, and a substituted or unsubstituted $C_7$-$C_{30}$ arylalkyl group, and L is independently a linking group; and x is 37, a silicone-containing comonomer represented by a structure of Formula IV:

(IV)

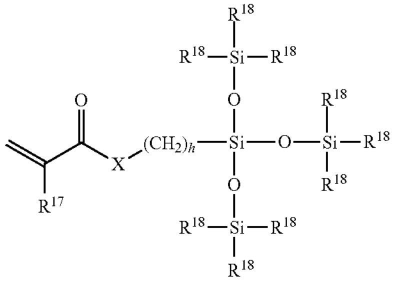

wherein X denotes —O— or —$NR^{19}$—, wherein $R^{19}$ is hydrogen or a $C_1$-$C_4$ alkyl group; $R^{17}$ denotes hydrogen or methyl; each $R^{18}$ independently denotes a $C_1$-$C_6$ alkyl group, a phenyl group or a group represented by:

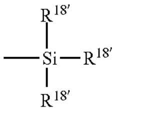

wherein each $R^{18'}$ independently denotes a $C_1$-$C_6$ alkyl, or a phenyl radical; and h is 1 to 10, and a silicone-containing comonomer represented by a structure of Formula V:

(V)

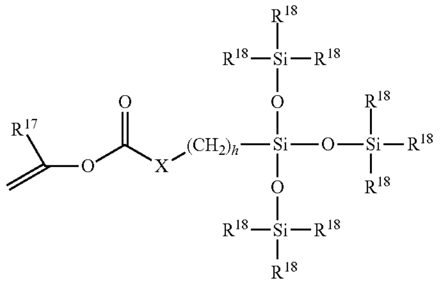

wherein X denotes —$NR^{19}$—, wherein $R^{19}$ denotes hydrogen or a $C_1$-$C_4$ alkyl group; $R^{17}$ denotes hydrogen or methyl; each $R^{18}$ independently denotes a $C_1$-$C_6$ alkyl group, a phenyl group or a group represented by:

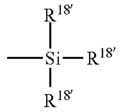

wherein each $R^{18'}$ independently denotes a $C_1$-$C_6$ alkyl group, or a phenyl group; and h is 1 to 10.

8. The ophthalmic device according to claim 1, wherein the one or more second ophthalmic device-forming comonomers comprise one or more hydrophilic comonomers.

9. The ophthalmic device according to claim 8, wherein the one or more hydrophilic comonomers are selected from the group consisting of a hydrophilic vinyl monomer, an acrylamide and mixtures thereof.

10. The ophthalmic device according to claim 1, wherein the monomeric mixture comprises:

about 0.1 wt. % to about 50 wt. %, based on the total weight of the monomeric mixture, of the one or more multifunctional crosslinking agents;

about 1 wt. % to about 80 wt. %, based on the total weight of the monomeric mixture, of the one or more first ophthalmic device-forming comonomers; and about 1 wt. % to about 80 wt. %, based on the total weight of the monomeric mixture, of the one or more second ophthalmic device-forming comonomers.

11. The ophthalmic device according to claim 1, which is a contact lens or a soft hydrogel.

12. A method for making an ophthalmic device, comprising:

a) curing a monomeric mixture in a mold, the monomeric mixture comprising:

(i) one or more multifunctional crosslinking agents comprising one or more repeating units of one or more siloxanyl units or one or more silyl-alkyl-siloxanyl units, and at least two ethylenically unsaturated reactive end groups, wherein one of the at least two ethylenically unsaturated reactive end groups is a (meth) acrylate-containing reactive end group or an acrylamide-containing reactive end group and the other one of the at least two ethylenically unsaturated reactive end groups is an allyl-containing reactive end group;

(ii) one or more first ophthalmic device-forming comonomers having at least one reactive group that preferentially reacts with the (meth) acrylate-containing reactive end group or the acrylamide-containing reactive end group of the multifunctional crosslinking agent, wherein the one or more first ophthalmic device-forming comonomers comprise one or more silicone-containing comonomers represented by a structure of Formula I:

(I)

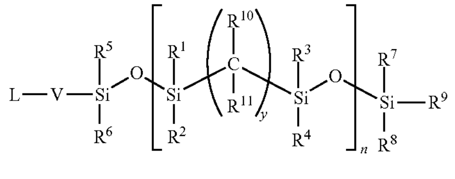

wherein V is an ethylenically unsaturated polymerizable group, L is a linker group or a bond; $R^1$, $R^2$, $R^3$, $R^4$, $R^5$, $R^6$, $R^7$, $R^8$, and $R_9$ are independently H, a $C_1$ to $C_{12}$ alkyl group, a halo alkyl group, a $C_3$ to $C_{12}$ cycloalkyl group, a heterocycloalkyl group, a $C_2$ to $C_{12}$ alkenyl group, a haloalkenyl group, or a $C_6$ to $C_{12}$ aromatic group; $R^{10}$ and $R^{11}$ are independently H or a $C_1$ to $C_{12}$ alkyl group, wherein at least one of $R^{10}$ and $R^{11}$ is hydrogen; y is 2 to 7 and n is 1 to 100; and (iii) one or more second ophthalmic device-forming comonomers having at least one reactive group that preferentially reacts with the allyl-containing reactive end group of the multifunctional crosslinking agent; and (b) dry releasing the ophthalmic device from the mold.

13. The method according to claim 12, wherein the one or more multifunctional crosslinking agents comprise 1 to about 100 repeating units of the silyl-alkyl-siloxanyl group, and the alkyl group of the silyl-alkyl-siloxanyl group has from 2 to about 4 carbon atoms.

14. The method according to claim 12, wherein the one or more first ophthalmic device-forming comonomers further comprise one or more additional silicone-containing comonomers selected from the group consisting of a silicone-containing comonomer represented by a structure of Formula II:

(II)

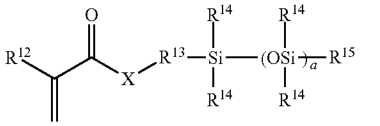

wherein $R^{12}$ is H or methyl; X is O or $NR^{16}$; wherein $R^{16}$ is selected from H, or a $C_1$ to $C_4$ alkyl group, optionally substituted with one or more hydroxyl groups; $R^{13}$ is a divalent alkyl group, optionally functionalized with a group selected from the group consisting of an ether group, a hydroxyl group, a carbamate group and combinations thereof; each $R^{14}$ is independently a phenyl group or a $C_1$ to $C_4$ alkyl group, optionally substituted with fluorine, a hydroxyl group or an ether group; $R^{15}$ is a $C_1$ to $C_4$ alkyl group; and a is 2 to 50, a polysiloxane prepolymer represented by a structure of Formula III:

(III)

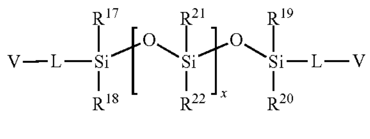

wherein each V is an independently reactive functional end group; $R^{17}$ to $R^{22}$ are independently a straight or branched, substituted or unsubstituted $C_1$-$C_{30}$ alkyl group, a substituted or unsubstituted $C_3$-$C_{30}$ cycloalkyl group, a substituted or unsubstituted $C_4$-$C_{30}$ cycloalkylalkyl group, a substituted or unsubstituted $C_3$-$C_{30}$ cycloalkenyl group, a substituted or unsubstituted $C_6$-$C_{30}$ aryl group, and a substituted or unsubstituted $C_7$-$C_{30}$ arylalkyl group, and L is independently a linking group; and x is 37, a silicone-containing comonomer represented by a structure of Formula IV:

(IV)

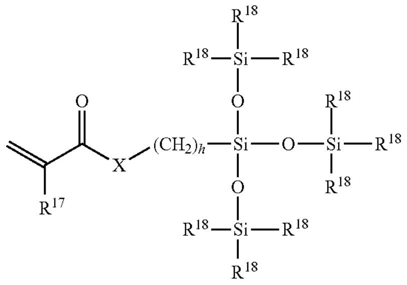

wherein X denotes —O— or —$NR^{19}$—, wherein $R^{19}$ is hydrogen or a $C_1$-$C_4$ alkyl group; $R^{17}$ denotes hydrogen or methyl; each $R^{18}$ independently denotes a $C_1$-$C_6$ alkyl group, a phenyl group or a group represented by:

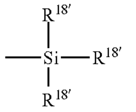

wherein each $R^{18'}$ independently denotes a $C_1$-$C_6$ alkyl, or a phenyl radical; and h is 1 to 10, and a silicone-containing comonomer represented by a structure of Formula V:

(V)

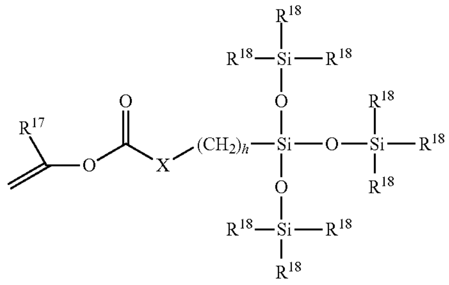

wherein X denotes —$NR^{19}$—, wherein $R^{19}$ denotes hydrogen or a $C_1$-$C_4$ alkyl group; $R^{17}$ denotes hydrogen or methyl; each $R^{18}$ independently denotes a $C_1$-$C_6$ alkyl group, a phenyl group or a group represented by:

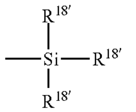

wherein each $R^{18'}$ independently denotes a $C_1$-$C_6$ alkyl group, or a phenyl group; and h is 1 to 10.

15. The method according to claim 12, wherein the one or more second ophthalmic device-forming comonomers comprise one or more hydrophilic comonomers selected from the group consisting of a hydrophilic vinyl monomer, an acrylamide and mixtures thereof.

16. The method according to claim 12, wherein the monomeric mixture comprises:

about 0.1 wt. % to about 50 wt. %, based on the total weight of the monomeric mixture, of the one or more multifunctional crosslinking agents;

about 1 wt. % to about 80 wt. %, based on the total weight of the monomeric mixture, of the one or more first ophthalmic device-forming comonomers; and about 1 wt. % to about 80 wt. %, based on the total weight of the monomeric mixture, of the one or more second ophthalmic device-forming comonomers.

17. The method according to claim 12, wherein the ophthalmic device is a contact lens or a soft hydrogel.

18. The method according to claim 12, wherein the one or more second ophthalmic device-forming comonomers comprise N-vinyl pyrrolidone.

19. The ophthalmic device according to claim 4, wherein the one or more repeating units include a silyl-alkyl-siloxanyl group derived from a stepwise anionic polymerization reaction comprising hexamethylcyclotrisiloxane.

20. The ophthalmic device according to claim 1, wherein the one or more second ophthalmic device-forming comonomers comprise N-vinyl pyrrolidone.

* * * * *